United States Patent [19]

Murray

[11] Patent Number: 4,978,500
[45] Date of Patent: Dec. 18, 1990

[54] INHIBITOR FOR METAL CORROSION BY BRINE

[76] Inventor: W. Bruce Murray, 28 Willow Grove, Irvine, Calif. 92714

[21] Appl. No.: 407,752

[22] Filed: Sep. 15, 1989

[51] Int. Cl.$^5$ .................. C23F 11/00; C23F 11/06; C23C 22/07; C23C 28/00
[52] U.S. Cl. ............................... 422/7; 422/13; 148/253; 148/254; 148/255; 148/256; 252/8.555
[58] Field of Search ............ 422/7, 13; 148/253, 148/254, 255, 256; 252/8.555

[56] References Cited

U.S. PATENT DOCUMENTS

| | | | |
|---|---|---|---|
| 1,903,041 | 3/1933 | Hall et al. | 252/8.555 |
| 1,997,256 | 4/1935 | Hall | 252/8.555 |
| 2,096,736 | 10/1937 | Dinley . | |
| 2,900,222 | 8/1959 | Kahler . | |
| 2,980,620 | 4/1961 | Hatch . | |
| 2,988,509 | 6/1961 | Schilberg . | |
| 3,029,127 | 4/1962 | Pollitzer . | |
| 3,215,637 | 11/1965 | Clerbois . | |
| 3,248,249 | 4/1966 | Collins . | |
| 3,313,650 | 4/1967 | Raeuber . | |
| 3,432,428 | 3/1969 | Wirth et al. . | |
| 3,542,686 | 11/1970 | Miller . | |
| 3,837,803 | 9/1974 | Carter et al. | 422/13 |
| 3,869,317 | 3/1975 | Marx | 148/253 |
| 3,933,459 | 1/1976 | Moore et al. . | |
| 4,297,237 | 10/1981 | Boffardi | 422/17 |
| 4,303,568 | 12/1981 | May et al. | 422/13 |
| 4,448,702 | 5/1984 | Kaes . | |
| 4,512,907 | 4/1985 | McConnell . | |
| 4,634,532 | 1/1987 | Logan et al. | 210/699 |
| 4,668,416 | 5/1987 | Neal . | |
| 4,849,171 | 7/1989 | Murray | 422/13 |

FOREIGN PATENT DOCUMENTS

| | | |
|---|---|---|
| 1459642 | 1/1969 | Fed. Rep. of Germany . |
| 1459664 | 1/1969 | Fed. Rep. of Germany . |
| 482488 | 6/1977 | U.S.S.R. . |
| 1536660 | 12/1978 | United Kingdom . |
| 1555468 | 11/1979 | United Kingdom . |

OTHER PUBLICATIONS

Evans, *The Corrosion and Oxidation of Metals: Scientific Principles and Practical Applications*, Edward Arnold Publishers Ltd.: London, 1967, pp. 166-167.

Primary Examiner—Robert J. Warden
Assistant Examiner—Thalia P. Vassilatos
Attorney, Agent, or Firm—Plante, Strauss, Vanderburgh & Connors

[57] ABSTRACT

An inhibitor composition of sodium hexametaphosphate and a water soluble orthophosphate, together with a pH adjusting, water-soluble alkali, effectively prevents corrosion of metal surfaces by sodium chloride brines. This corrosion inhibitor can be used to prevent corrosion of motor vehicles and steel reinforcing members and structures by brines formed by roadway deicing salt.

15 Claims, 1 Drawing Sheet

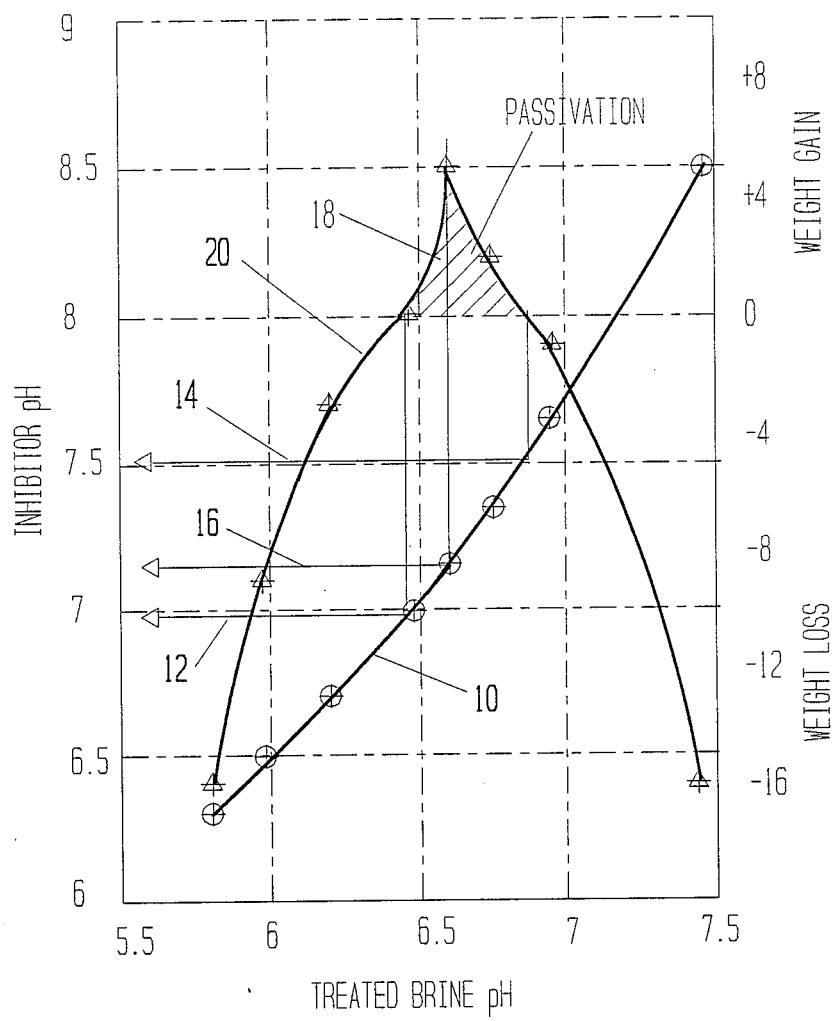

INHIBITOR FOR METAL CORROSION BY BRINE

BACKGROUND OF THE INVENTION

1. Field of Invention

This invention relates to a corrosion inhibitor for sodium chloride brines, and in particular to a corrosion inhibitor which can be used to prevent corrosion of motor vehicles and steel reinforcing members and structures by brines formed by roadway deicing salt.

2. Brief Statement of the Prior Art

Sodium chloride is a widely used industrial chemical. Perhaps the most commonly observed application of sodium chloride is the use of the salt as a road cover in freezing climates, where its high solubility depresses the freezing point of water, thereby melting ice and snow on the surfaces to which it is applied.

A common problem experienced in the various applications of sodium chloride is that the salt promotes corrosive attack on metal surfaces. The corrosiveness of sodium chloride brines is particularly troublesome in the road cover applications where the brine which is splashed on the undersurfaces of cars can cause rapid corrosion and deterioration of the under panels and rocker panels of a car. Since modern car manufacturing techniques have almost universally adopted unitized construction for weight and manufacturing efficiencies, any corrosive attack of brines on the undersurfaces of automobiles is particularly troublesome as the deterioration of such surfaces by corrosion is often not economically repairable. Furthermore, salts added to roads adversely affect roadside vegetation and have been observed to kill roadside trees. These salts are frequently transported as saturated brine solutions in pipelines, and their corrosiveness to steel presents a significant problem to such handling.

The problem of accelerated corrosion by sodium chloride brines is thus a problem which has not, heretofore, been adequately addressed by the prior art. Some solutions to the problem have included the substitution of other salts such as calcium or magnesium acetates or chromates for the road cover applications. These substitutions are not satisfactory because of a prohibitively high cost and because of potentially adverse effects on the environment.

Ideally, any corrosion inhibitor used with sodium chloride should be effective at extremely low concentrations to minimize environmental problems and should be colorless to avoid staining or discoloring of metal surfaces, wearing apparel and the like which come in contact with brine solutions of sodium chloride. The inhibitor should be effective over a very wide range of concentrations, particularly when applied for inhibiting corrosion of brines used in road covers since the brines which are formed by melting of ice and snow in the presence of sodium chloride can be expected to have an extremely wide range of concentration of the sodium chloride. The inhibitor should also be soluble over the wide range of concentrations anticipated in its application. Finally, the inhibitor should be compatible with the sodium chloride manufacturing process and permit the manufacture of granular and corrosion inhibited sodium chloride without any significant effect on the granulation process.

OBJECTIVES OF THE INVENTION

It is an object of this invention to provide a composition that will inhibit the corrosion of metal, particularly steel, surfaces by aqueous brines formed by roadway deicing salt.

It is a further object of this invention to provide an inhibitor composition which can be applied to roadways to prevent corrosion by the brines which are formed when the roadway is treated with salts to prevent icing.

It is an object of this invention to prevent the corrosion of metal panels of motor vehicles which are exposed to salt brines formed on roadways.

It is a further object of this invention to provide an inhibitor which is generally useful to prevent the corrosion of reinforcing steel in concrete roadways and structural steel in roadway bridges and the like by brines formed from deicing salt.

Other and related objects will be apparent from the following description of the invention.

BRIEF DESCRIPTION OF THE INVENTION

This invention comprises an inhibitor for preventing corrosion of metal surfaces by brine. The inhibitor comprises a composition of sodium hexametaphosphate and a water soluble orthophosphate in molar proportions of from 5 to about 10 molar parts of orthophosphate per part of hexametaphosphate. Additionally, the inhibitor composition contains a water soluble alkali which is effective to reduce the pH of water in which the inhibitor is dissolved. Sufficient alkali is incorporated in the inhibitor to adjust its pH value to between about 7 and 7.5, most preferably about 7.2.

The inhibitor is used by dissolving it in the brine which is exposed to the metal surface. The inhibitor can be used to inhibit the corrosive attack of salt used for deicing roadways simply by broadcasting or spraying the inhibitor on the roadway either prior, during or shortly after the application of sodium chloride. Alternatively, the inhibitor can be mixed with the salt or sprayed onto the salt prior to its application to the roadway.

BRIEF DESCRIPTION OF THE DRAWINGS

The invention will be described with reference to the FIGURE, which is a performance curve of the inhibitor used with sodium chloride brines.

DESCRIPTION OF PREFERRED EMBODIMENT

The invention comprises an inhibitor for the corrosive attack of the brine on metal surfaces. It is particularly intended for inhibition of corrosion of steel surfaces, however, it is equally applicable to inhibition of corrosive attack on aluminum and copper surfaces as well as alloys of steel, copper and aluminum.

The inhibitor composition is a mixture of sodium hexametaphosphate and a soluble orthophosphate. Various orthophosphate sources can be used such as orthophosphoric acid, and the alkali metal and other water soluble salts thereof. Of these, the sodium salts such as sodium dihydrogen orthophosphate and diosodium hydrogen orthophosphate are preferred.

The hexametaphosphate and orthophosphate are used in molar proportions from about 5 to about 10 molar parts of the orthophosphate per molar part of the metaphosphate. Preferably the proportion is from 7.5 to 8.5 and, most preferably at 8, molar parts of the orthophosphate per molar part of the sodium hexametaphosphate.

Preferably the inhibitor composition is used as an aqueous solution and, for this purpose, can have a concentration up to its maximum solubility, typically about 50–65 weight percent.

The inhibitor composition should also contain a suitable quantity of a water soluble alkali. Examples of suitable water soluble alkali ingredients include sodium bicarbonate, sodium carbonate, sodium hydroxide, potassium hydroxide, etc. The amount of the alkali which is incorporated in the inhibitor should be an amount sufficient to adjust the pH of the inhibitor to a value which is preselected, depending on the brine which is to be inhibited.

The empirical formula for the composition is: $Na_6P_6O_{18} + 8 - x(NaH_2PO_4) + x\, Na_2HPO_4$; where the value of x depends on the degree of alkali addition.

When sodium chloride brines are to be treated, the quantity of the alkali which is incorporated in the inhibitor should be sufficient to adjust the pH value of the inhibitor to between about 7 and 8, preferably from about 7.1 to 7.3. The actual amount of alkali required for this will depend on the orthophosphate source which is used since a greater amount of alkali will be required to neutralize orthophosphoric acid then would be required to adjust the pH of sodium dihydrogen orthophosphate.

Preferably the inhibitor solution is prepared by mixing the alkali ingredient with the orthophosphate, particularly when orthophosphoric acid is used. This mixing is accompanied by the exotherm resulting from neutralization of the acid, and it is preferred to avoid this heat release in the presence of the metaphosphate, as the latter can be hydrolyzed in hot aqueous solutions. The solution of the alkali and orthophosphate is preferably cooled to approximately 80 degrees centigrade prior to the addition of the hexametaphosphate.

It is believed that the inhibitor functions in the following manner:

Corrosion of steel in aerated brine results in formation of ferrous ions at the anode and hydroxyl ions at the cathode in accordance with the following reaction:

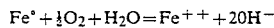
$Fe^\circ + \tfrac{1}{2}O_2 + H_2O = Fe^{++} + 2OH^-$

The phosphate anions of the inhibitor are reactive with the hydroxyl ions, combining as follows:

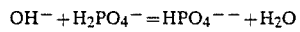
$OH^- + H_2PO_4^- = HPO_4^{--} + H_2O$

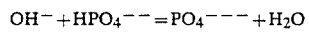
$OH^- + HPO_4^{--} = PO_4^{---} + H_2O$

When the hydroxyls are thus eliminated from the cathode surfaces, the sodium hexametaphosphate deposits itself as a plated film on the surface of the cathode (steel surface), passivating the surface against further corrosion, as follows:

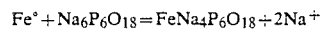
$Fe^\circ + Na_6P_6O_{18} = FeNa_4P_6O_{18} + 2Na^+$

Because the orthophosphate is an effective hydroxyl scavenger, it greatly reduces the concentration of hexametaphosphate which is required for passivation of the steel surface.

The inhibitor is used by incorporating it in the brine which is to be treated. The inhibitor can simply be added to the brine. The inhibitor should be incorporated in the brine at such a concentration that when the combination, or blend, is applied to a roadway, the inhibitor dosage is approximately at least 100 parts per million, preferably, in excess of 200 parts per million, and most preferably, about 250 parts per million. The maximum amount of the inhibitor which is used is not limiting as excess quantities do not affect its function or performance in the invention. Phosphates are, however, potentially objectionable as environmental additives as they tend to cause algae bloom and other obnoxious affects in stagnant waters. According, it is preferred to limit the amount of the phosphate to an amount not substantially greater than that required for effectiveness. This is also desirable from an economical viewpoint. Accordingly, the maximum concentration of the inhibitor which is used is about 500 parts per million and can, in some applications, be as high as 1000 parts per million. Preferably, the inhibitor is used at a concentration from about 200 to 350 parts per million. The aforementioned concentrations of the inhibitor are specified for the corrosion effective component, i.e. the hexametaphosphate and the orthophosphate components, on an alkali-free basis.

When the inhibitor is to be applied to roadways to inhibit the corrosive attack of de-icing salt which has been applied to the roadways, the application technique simply comprises spraying an aqueous solution of the composition onto the roadway. Preferably in such application a visible dye such as a blue or green dye can be incorporated in the solution to provide visual evidence or confirmation of the treatment.

The aqueous solution which is applied to the roadway can be varied in concentration, depending on the particular spray equipment which is used. With most spray equipment, the concentration can be from about 5 to about 20 weight percent, preferably from about 5 to 10 weight percent.

For each 0.1 inch of ice or 1 inch of snow, on each 20 feet width of roadway (one lane), the composition is applied to a roadway at a dosage of approximately 14 lbs of inhibitor (dry weight, less alkali) per mile of roadway. This dosage can vary from about 14 lbs to 20 lbs. (from 250 to 350) ppm inhibitor dosage. This application can be prior to, during or shortly after the application of the de-icing salt to the roadway so that the phosphate inhibitor will be present and will dissolve in the brine which is formed by the application of the ice to the roadway.

The following example will demonstrate the application of the invention and the results which can be obtained thereby.

EXAMPLE 1

In this example the inhibition activity on sodium chloride brine was investigated. For this investigation, one gram of sodium hexametaphosphate was dissolved in a liter of water with 1.5 gram of monosodium orthophosphate. Sodium bicarbonate in varied amounts was added to eight aliquot portions of the stock inhibitor solution, thus preparing a series of solutions having the following pH values: 6.28, 6.49, 6.71, 7.00, 7.35 and 8.48.

The resulting solutions were then added to brines which were prepared by adding 30 grams of sodium chloride to a liter of water.

In the corrosion test, sufficient of the inhibitor solution to provide 0.25 grams of inhibitor was added to one liter of sodium chloride brine. Steel coupons, one-half inch by 3 inches and 1/16 inch thick, were polished and pre-weighed, and were then suspended in the inhibited brine solution. The coupons were permitted to remain in the brines for a period of 48 hours and were then removed, dried, inspected and weighed. The pH values of the brines were also determined. The following table summarizes the results:

TABLE 1

| EXPERIMENT | A | B | C | D |
|---|---|---|---|---|
| pH | 6.28 | 6.49 | 6.71 | 7.00 |
| NaCl, gm | 30 | 30 | 30 | 30 |
| pH | 5.79 | 5.99 | 6.22 | 6.49 |
| Net Spec. Wt., gm | −.0016 | −.0009 | −.0004 | 0 |
| EXPERIMENT | E | F | G | H |
| pH | 7.15 | 7.35 | 7.66 | 8.48 |
| NaCl, gm | 30 | 30 | 30 | 30 |
| pH | 6.61 | 6.75 | 6.97 | 7.44 |
| Net Spec. Wt., gm | +.0005 | +.0002 | −.0001 | −.0016 |

The results are graphically depicted in the FIGURE, which shows curve 10 for the pH of the treated brine as a function of the pH of the inhibitor. Curve 20 of the FIGURE illustrates the corrosion rate on the steel coupon. As can be seen, the corrosion rapidly decreases reaching a minimal value of 0 corrosion when the pH of the treated brine is 6.46 (line 11) and the pH of the inhibitor is about 7 (line 12). As the inhibitor pH is raised about 7.5, the corrosion increases with increasing alkalinity of the inhibitor. As apparent from the FIGURE, the effective pH value for the inhibitor is fairly narrow from about 7.0 (brine pH of 6.46) to about 7.5 (brine pH of 6.9), as shown by line 14, with its maximum effectiveness at 7.15 (brine pH of 6.6), as shown by line 16. The passivated area is the shaded area 18 on the FIGURE.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

I claim:

1. A method of inhibiting the corrosion of metal surfaces by brines containing from 0.5 to about 5 weight percent of sodium chloride, which comprises:
   a. incorporating in the brine, sodium hexametaphosphate in an amount from 100 to about 500 parts per million, and effective to form a passivating surface on said metal surface;
   b. also incorporating in said brine, a soluble orthophosphate in a molar proportion to said hexametaphosphate from 5 to about 10 molar parts per molar part of said hexametaphosphate; and
   c. adjusting the pH of said brine to a value from 6.46 to 6.9.

2. The method of claim 1 wherein the pH of said brine is adjusted by the addition thereto of an alkali selected from the class consisting of sodium bicarbonate, sodium carbonate, sodium hydroxide.

3. The method of claim 1 wherein said pH is adjusted to a value of 6.6.

4. The method of claim 1 as applied to the prevention of corrosion by brines formed by salt applied to roadways wherein said sodium hexametaphosphate and soluble orthophosphate are applied to said roadway at total dosage from 10 to about 20 pounds per mile of twenty foot width of roadway.

5. The method of claim 4 wherein said sodium hexametaphosphate and soluble orthophosphate are admixed with salt prior to its application to a roadway.

6. The method of claim 4 wherein said sodium hexametaphosphate and soluble orthophosphate are applied to said roadway separately from the application of salt thereto.

7. The method of claim 4 wherein said sodium hexametaphosphate and soluble orthophosphate are also contain a dye to render them visible when applied to said roadway.

8. A method of inhibiting the corrosion of metal surfaces by brines containing from 0.5 to about 5 weight percent of sodium chloride, which comprises:
   a. adding to said brine an inhibitor having a pH from about 7 to 7.5 and consisting of:
      (i) sodium hexametaphosphate; and
      (ii) a soluble orthophosphate in a molar proportion to said sodium hexametaphosphate from 5 to about 10 molar parts per molar part of said hexametaphosphate; and
   b. adjusting the amount of said inhibitor in said brine to provide a concentration of sodium hexametaphosphate therein from 100 to about 500 part per million, effective to form a passivating surface on said metal surface.

9. The method of claim 8 including the step of adjusting the pH of said brine to a value from 6.46 to 6.9.

10. The method of claim 9 wherein the pH of said brine is adjusted by the addition thereto of an alkali selected from the class consisting of sodium bicarbonate, sodium carbonate, sodium hydroxide.

11. The method of claim 9 wherein the pH of said brine is adjusted to a value of 6.6.

12. The method of claim 8 as applied to the prevention of corrosion by brines formed by salt applied to roadways wherein said inhibitor is applied to said roadway at a dosage from 10 to about 20 pounds per mile of twenty foot width of roadway.

13. The method of claim 12 wherein said inhibitor is admixed with salt prior to its application to a roadway.

14. The method of claim 12 wherein said inhibitor is applied to said roadway separately from the application of salt thereto.

15. The method of claim 12 wherein said inhibitor also contains a dye to render it visible when applied to said roadway.

* * * * *